Dec. 31, 1968    H. H. DOWNS ET AL    3,419,177
ELECTRICAL PANELBOARD FRONT WITH KNOCKOUTS AND SUPPORT
FOR OVERLOAD DEVICES
Filed Aug. 28, 1967
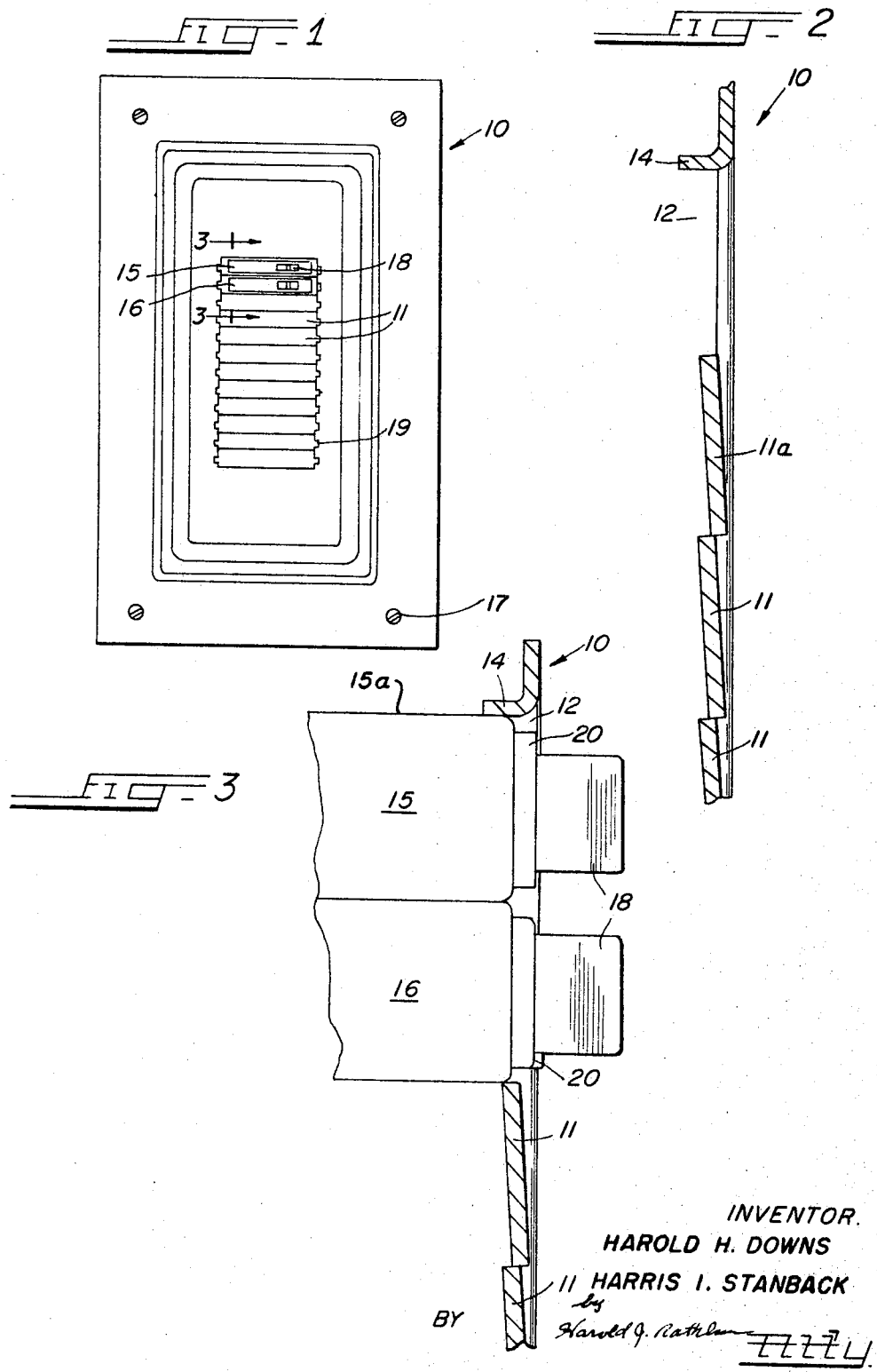
INVENTOR.
HAROLD H. DOWNS
HARRIS I. STANBACK
BY United States Patent Office 3,419,177
Patented Dec. 31, 1968

3,419,177
ELECTRICAL PANELBOARD FRONT WITH KNOCKOUTS AND SUPPORT FOR OVERLOAD DEVICES
Harold H. Downs and Harris I. Stanback, Lexington, Ky., assignors to Square D Company, Park Ridge, Ill., a corporation of Michigan
Filed Aug. 28, 1967, Ser. No. 663,665
3 Claims. (Cl. 220—24.3)

ABSTRACT OF THE DISCLOSURE

An end one of the knockouts in a row of knockouts in a panelboard front is omitted and an opening bordered at one edge by an inturned flange provided in its stead. The flange is engaged by a side wall of an end one of a row of overload responsive devices in the panelboard to insure that all of the devices are perpendicular to the back wall of the panelboard.

BACKGROUND OF THE INVENTION

*Field of invention.*—Electrical switchboard of the panelboard or load center type.

*Description of the prior art.*—In the mounting of electrical overload responsive devices, such as molded case circuit breakers, in panelboards or load centers, it is desired to mount the devices in as small a space as possible. Accordingly, the devices are generally in side-by-side engagement within a panelboard box and have their front surfaces exposed through, and their operating handles extending through, an opening in a removable front wall of the panelboard box. The front wall, hereinafter termed a panelboard front, may be enclosed by an outer hinged door.

In the manufacture and sale of such panelboards, the panelboard is usually sold by the manufacturer with none of the overload devices in place, the proper kind and number of devices to meet the user's requirements being mounted in the panelboard after the panelboard is installed. A panelboard front is, therefore, usually formed with a plurality of knockouts of uniform size totally closing what would otherwise be an opening through the panelboard front and which knockouts may be readily removed one-by-one from the front by the user as creation or subsequent enlargement of the opening is desired.

In a common form of panelboard, such as described, for example, in Kingdon Patent No. 3,105,173, which issued on Sept. 24, 1963, each overload device mounted in the panelboard is held in position by engagement of fastening means adjacent one rearward end corner thereof with a cooperating fastening means near the back of the panelboard box and by a spring clip or equivalent means adjacent the other rearward end corner which mechanically and electrically engages a bus bar positioned near the back of the box. Although a good mechanical and electrical connection is thereby provided between the device and the box and bus barr when the device is perpendicular to the back wall of the box, there is no assurance that the device will be or remain perpendicular.

Heretofore, there has been no means provided near or on the panelboard front to maintain the devices in a row of such overload devices in the desired perpendicular position. In prior panelboard fronts, contact between an edge of the opening therein and a side wall of an end or first one of a row of devices cannot be assured unless the devices protrude too far into, or through, the opening. Hence, the first device in the row can become tilted and the other devices in side-by-side engagement in the row then are also tilted resulting in an untidy appearance and possible poor electrical connections with the bus bar.

SUMMARY OF THE INVENTION

According to the present invention, what would otherwise be an end or first one of a row of knockouts in a panelboard front is omitted leaving an opening for one of the overload devices. At least a portion of the metal which would otherwise constitute the end or first knockout is bent inwardly to form a flange perpendicular to the principal plane of the front. When the first overload device of a row of similar devices is positioned in the panelboard, a side wall of the first device engages the flange and is held in a desired perpendicular position thereby. A second device installed in the panelboard is forced against the first device in side-by-side relation and is thus also held in a perpendicular position. Perpendicular positioning of additional devices is similarly assured.

BRIEF DESCRIPTION OF THE DRAWINGS

FIG. 1 is a front elevational view of a panelboard having a front in accordance with this invention;

FIG. 2 is a sectional view of the panelboard front taken as indicated by the line 3—3 of FIG. 1 before removal of any knockouts; and FIG. 3 is a sectional view similar to FIG. 2 taken generally along the line 3—3 of FIG. 1.

DESCRIPTION OF THE PREFERRED EMBODIMENT

The invention has been illustrated in the drawing in connection with a sheet metal front 10 for an enclosing box, not shown, of a panelboard and having a centrally-disposed row of knockouts 11 of equal size which are removable one-by-one to enlarge an opening 12 in the front 10. The opening 12 before removal of any of the knockouts, as shown in FIG. 2, is of the same size and shape as each of the knockouts 11, and its upper edge is defined by an inwardly-turned flange portion 14 integral with and perpendicular to the remainder of the front 10. The panelboard is shown in FIGS. 1 and 3 with a first knockout 11a (FIG. 2) of the row of knockouts 11 removed and with two overload responsive devices 15 and 16 mounted in side-by-side engagement with their front surfaces exposed through the thus enlarged opening 12 and with their respective operating handles 18 projecting through the opening. It will be understood that the devices 15 and 16 are mounted in the panelboard in a manner such as disclosed in the previously mentioned Kingdon patent.

It will be seen from the drawing that each of the knockouts 11 is substantially sheared from the sheet metal wall of the panelboard front 10 except for respective pairs of tie points 19 at its opposite minor edges. Each tie point 19 includes unsheared metal which interconnects the section 11 with the remainder of the front 10 although the tie points may be partially sheared to facilitate the twisting of the knockout 11 from the front. The construction of the knockouts 11 is more fully described in Moore Patent 2,726,005, which issued on Dec. 6, 1955. Other types of knockout construction may be used if desired.

As mentioned, and in accordance with this invention, a portion of the metal of the front 10 is cut away adjacent the first knockout 11a of the row of knockouts 11 to form the opening 12 as shown in FIG. 2. A portion of the front 10 along the edge of the cut-away portion remote from the first knockout 11a is bent inwardly to form the flange portion 14 which is perpendicular to the principal plane of the front 10. The distance between the outer surface of the flange portion 14 and the adjacent edge of the first knockout 11 is equal to the width of one of the knockouts 11 and of each of the devices 15 and 16. The front 10 is secured in fixed position vertically and horizontally of the box and generally parallel to the back of the box by a plurality of screws 17 and the mounting means in the rear of the box are centered under the respective knockouts 11. When the first device 15 is properly positioned as indicated best in FIG. 3, an outer marginal area of a side 15a thereof engages the flange portion 14 thereby to maintain the device 15 perpendicular to the principal plane of the front 10. Additional devices, such as the device 16, when mounted in a row with the first device 15, they must also be in the desired perpendicular position because the devices are in side-by-side engagement.

Heretofore, in panelboards having fronts constructed as in the previously mentioned Moore Patent No. 2,726,005, for example, the first device 15 in the row was apt to be tilted because engagement between the thin edge of the front where it was separated from the first of a row of knockouts 11 and a side of the device was assured only if the panelboard was designed so that the devices normally protruded through the opening. This was because, when panelboards are installed, the distance between the panelboard front and the surface on which the rear of the devices rest is purposely made variable to compensate for inaccuracies in positioning the box with respect to the surface of the wall adjacent the panelboard. Further, many overload responsive devices, such as the devices 15 and 16, have narrow top boss portions 20. It was heretofore necessary, therefore, for the boss portion 20 to protrude through the opening 12 as well as a portion of the wider portion of the case of the device if perpendicular mounting was to be assured by engagement of a side of the case with the thin edge of the opening.

We claim:

1. In a sheet metal front for a panelboard containing electrical overload devices, removable means providing an enlargeable opening in the front exposing at least the major portion of the front surfaces of said devices and through which operating handles for said devices may project, said removable means comprising a multiplicity of removable sections aligned in a row originally integral with said front but substantially fully sheared therefrom so as to be readily removable one-by-one, the improvement which comprises providing an intial opening in the front at one end of said row of sections substantially the same size and shape as one of said sections and providing an inwardly-directed flange at the edge of said initial opening opposite the section contiguous thereto.

2. A sheet metal front as in claim 1 wherein said flange is integral with the front.

3. A sheet metal front as in claim 2 wherein said removable sections are of uniform size and said initial opening is of the same size as the respective removable sections.

References Cited
UNITED STATES PATENTS 2,726,005   12/1955   Moore _____ 220—24.3

THERON E. CONDON, *Primary Examiner.*

JAMES R. GARRETT, *Assistant Examiner.*